United States Patent [19]

Shimiya et al.

[11] 4,039,840
[45] Aug. 2, 1977

[54] INTENSIFYING SCREENS

[75] Inventors: Keiji Shimiya, Hiratsuka; Norio Miura, Isehara, both of Japan

[73] Assignee: Dai Nippon Toryo Co., Ltd., Osaka, Japan

[21] Appl. No.: 600,096

[22] Filed: July 29, 1975

[30] Foreign Application Priority Data

Jan. 6, 1975 Japan .................................... 50-134

[51] Int. Cl.² .............................................. G01J 1/58
[52] U.S. Cl. .................................... 250/486; 250/483
[58] Field of Search ............... 250/483, 486, 487, 488; 96/1.8; 156/249; 427/64, 65, 67, 71, 73

[56] References Cited

U.S. PATENT DOCUMENTS 3,077,398  2/1963  Jones ..................................... 96/1.8
3,717,764  2/1973  Fujimura et al. ..................... 250/486

Primary Examiner—Davis L. Willis
Attorney, Agent, or Firm—Gerald J. Ferguson, Jr.; Joseph J. Baker

[57] ABSTRACT

A radiographic intensifying screen having improved response function in the low spatial frequency region and high sharpness comprising a support and a fluorescent layer formed on the support, said fluorescent layer having dispersed therein fluorescent substance grains and having a grain size distribution of the fluorescent substance grains such that the grain size becomes smaller gradually from the front surface of the fluorescent layer to the back surface of the layer.

12 Claims, 10 Drawing Figures

X-RAY

INTENSIFYING SCREENS

BACKGROUND OF THE INVENTION

1. Field of the Invention

The present invention relates generally to radiography and more particularly it relates to radiographic intensifying screens having improved spatial frequency characteristics (or response function) in the low spatial frequency region and being capable of providing radiographs having excellent image qualities.

2. Description of the Prior Art

Radiography is generally classified into two types, viz, medical radiography used for medical diagnosis and industrial radiography used for nondestructive inspection of industrial materials. In the both types the basic reasons for lack of definition in radiographs are the geometric unsharpness of the focal spot of the X-ray tube, the movement of the subject, the influence of radiation scattered from the subject, the response functions of intensifying screens, X-ray films, and the naked eye observing the radiographs, etc., and thus one important factor in overcoming the aforesaid faults is provision of intensifying screens with spatial frequency characteristics or response function that can improve the image qualities of radiographs.

The sharpness of intensifying screens is in a reciprocal relation to the sensitivity or screen speed of the intensifying screens and thus it is generally believed that the sensitivity of intensifying screens must be reduced to some extent for increasing the sharpness of the screens. It is also important in radiographic diagnosis to obtain radiographs having high diagnostic usefulness with as low a patient dosage as possible. In order to obtain radiographs having good image qualities without reducing the speed of intensifying screens, it is necessary to provide the intensifying screens with effective spatial frequency characteristics determined upon sufficient consideration of the whole radiographing system including the final observation of the medical radiographs.

There will now be given on analysis of a radiographing system and a description of the effective spatial frequency characteristics of intensifying screens which were induced from the results of the analysis. The detailed analysis and description which follow are presented in reference to FIGS. 1 to 4.

In analyzing the radiographing system, reference will be made to the typical radiographing conditions in the case of radiographing the stomach.

Under typical radiographing conditions, the focus-film distance is 65 mm, the focal spot size of the X-ray tube is 1.5 × 1.5 mm², and the exposure time is 0.08 second. In this case the geometric unsharpness $R_f(\nu)$ caused by the focal point of the X-ray tube expressed in terms of the response function is approximately shown by the following Gauss distribution:

$$R_f(\nu) = \exp[-2\pi^2(n/3)^2\nu^2(b/a)^2]$$

where $n$ is the size of the focal point of the X-ray tube, $\nu$ is the spatial frequency, $a$ is the focus-film distance, and $b$ is the subject-film distance.

The distance between the stomach of a prone human body and the X-ray film is usually about 10 cm and thus upon inserting the numerical values in the above equation, the geometric unsharpness $R_f(\nu)$ caused by the focal spot size of the X-ray tube is shown by curve $a$ of FIG. 1.

Furthermore, the unsharpness $R_m(\nu)$ of a radiograph caused by the movement of the stomach and expressed in terms of the response function is approximately shown by the following sampling function:

$$R_m(\nu) = (\sin\pi\nu vt/\pi\nu vt)$$

where $\nu$ is the spatial frequency, $v$ is the velocity of the movement of the subject, and $t$ is the exposure time.

From cineradiographic analysis, the movement of the stomach has been generally confirmed to be about 3 mm/sec and also the average exposure time is ordinarily 0.08 second. Thus, upon inserting these numerical values, the unsharpness $R_m(\nu)$ caused by the movement of the stomach is shown by curve $b$ of FIG. 1. Moreover, the medium type screens are usually used in the case of radiographing the stomach and the spatial frequency characteristics of these intensifying screens are approximately shown by the following exponential function:

$$R_s(\nu) = e^{-A\nu}$$

where $A$ is a constant defined by the nature of the intensifying screen and is usually about 0.6 in the medium type screens. Thus, upon inserting this numerical value, the spatial frequency characteristics $R_s(\nu)$ of the medium type screens are shown by curve $c$ of FIG. 1.

From the results described above, the total sharpness $R_T(\nu)$ in the radiographing system of the stomach can be expressed by the following equation:

$$R_T(\nu) = R_f(\nu)\cdot R_m(\nu)\cdot R_s(\nu)$$

The total sharpness $R_T(\nu)$ is shown by curve $d$ of FIG. 1.

As is clear from the results illustrated in FIG. 1, it is important in improving the image qualities in a radiographing system to increase the response function of the intensifying screen in the low spatial frequency regions (0–3.0 lines/mm). Also, as shown in FIG. 1, the total sharpness becomes nearly zero in the high spatial frequency region due to various factors even if the response function of the intensifying screen itself remains high.

Furthermore, since radiographs are observed by the naked eye for diagnosis, it is also necessary to consider the response function of the naked eye in analyzing the radiographing system. Typical examples of the response function of the naked eye reported up to this time are illustrated in FIG. 2, in which curve $a$ is the response function of the naked eye at 43.1 radlux reported in the report entitled "Optical and Photoelectrical Analog of the Eye" by O. H. Schade; JOSA Vol. 47, 47,721 (1956) and curve $b$ is the response function of the naked eye at 200 radlux reported in the report entitled "Response Function of Naked Eye" by Shingo Ooue; Applied Physics Vol. 28,531 (1959). Although the response function of the naked eye differs to some extent according to the observing conditions, the response function has its peak at about 0.5–1.0 line/mm and decreases rapidly with the increase in spatial frequency as shown in FIG. 2. As is clear from the result, it is effective for increasing the diagnostic usefulness of radiographs that the response function of the intensifying screen be high not in the high spatial frequency regions of 5–10 lines/mm but in the low spatial frequency regions up to 2–3 lines/mm.

An intensifying screen is essentially composed of a support and a fluorescent layer formed thereon and usually the fluorescent layer is further covered with a transparent protective layer. The fluorescent layer is composed of a fluorescent substance dispersed in a suitable resinous binder. In the preparation of intensifying screens, the thickness of the fluorescent layer, the kind of the fluorescent substance, the mixing ratio of the fluorescent substance and a resinous binder, the grain size of the fluorescent substance, etc., are properly selected upon sufficient consideration of the desired characteristics of the intensifying screen, such as sharpness, screen speed, etc. The fluorescent substance used for the fluorescent layer does not have uniform grain size but has a grain size distribution similar to the Gauss distribution. That is, it is quite difficult to prepare a fluorescent substance having uniform grain size and thus the grain size of the fluorescent substance forming the fluorescent layer is usually defined by the mean grain size and the deviation value.

The intensifying screen is usually prepared by directly applying a dispersion of a fluorescent substance in a resinous binder onto a cardboard or plastic support having a thickness of 0.3-0.5 mm maintained horizontally and after drying by heating, applying on the dried layer a transparent resinous protective composition at a thickness of about 10 microns or alternatively is prepared by applying on a smooth support base a transparent resinous protective layer about 10 microns thick followed by drying, applying thereon a dispersion of a fluorescent substance in a proper resinous binder followed by drying by heating, separating the layers from the support base, and applying the result under pressure onto an adhesive-bearing surface of a cardboard or plastic support by heating.

In both of the aforesaid production modes, the fluorescent substance grains are observed by a scanning electron microscope to be almost uniformly dispersed in a fluorescent layer 33 as shown schematically in FIG. 3 regardless of the size of the grains. Also, FIG. 4 shows a scanning electron photomicrograph of the cross section of the fluorescent layer in a conventional intensifying screen. The line image intensity distribution (the emission distribution of an intensifying screen to the linear X-ray input) of the conventional intensifying screen having the fluorescent layer as illustrated above is considerably broad as shown by curve a of FIG. 5 and as a result the intensifying screen is unsharp. Also, the conventional intensifying screen prepared by the latter manner as described above has an adhesive layer 32 between the fluorescent layer 33 and a support 31 as shown in FIG. 3 and thus in such an intensifying screen since the intensifying action thereof has been increased by rendering the support 31 light reflective, the light pass length becomes longer by twice the thickness of the adhesive layer 32 owing to the presence of said adhesive layer, and this also increases the unsharpness of the intensifying screen.

SUMMARY OF THE INVENTION

An object of this invention is to provide an intensifying screen having an improved fluorescent layer capable of providing radiographs having high image qualities.

Another object of this invention is to provide a radiographic intensifying screen having improved spatial frequency characteristics or response function in the low spatial frequency regions.

As the result of invesitgating the relation between the dispersion state of fluorescent grains in fluorescent layers of intensifying screens and the spatial frequency characteristics of the intensifying screens, the inventors have discovered that the response function of the intensifying screen in the low spatial frequency region can be increased by dispersing fluorescent substance grains in the fluorescent layer in such a grain size distribution that the fluorescent substance grains disposed in the surface portion (the side utilizing the emission of the fluorescent substance) have large grain sizes and the grain sizes of the fluorescent substance grains dispersed in the layer become gradually smaller toward the back side (the support side) of the fluorescent layer.

That is, according to the present invention, there is provided a radiographic intensifying screen comprising a support having coated thereon a fluorescent layer having such a grain size distribution of fluorescent substance grains that the grain size becomes gradually smaller from the surface (the side utilizing the emission of the fluorescent substance) of said fluorescent layer to the back surface (the support side) of the fluorescent layer.

The above and other objects, features and advantages of this invention will be made apparent from the following detailed description of the preferred embodiments thereof taken in conjunction with the accompanying drawings.

DESCRIPTION OF THE PREFERRED EMBODIMENTS

The radiographic intensifying screen of this invention having the aforesaid grain size distribution of the fluorescent substance grains in the fluorescent layer has such merits that the pass length of the light emitted from the fluorescent substance and reflected and scattered in the fluorescent layer is shortened, whereby the fluorescence can be effectively utilized at the surface of the layer and thus the sharpness of the intensifying screen can be improved.

Figure 6:
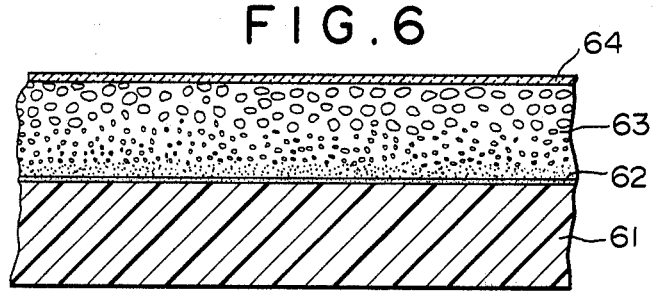
FIG. 6 is a schematic cross sectional view of an embodiment of the intensifying screen of this invention.

Now, the invention will further be described by referring to FIG. 6 showing a schematic cross sectional view of an embodiment of the intensifying screen of this invention. As shown in FIG. 6, in the intensifying screen of this invention the fluorescent substance grains constituting a fluorescent layer 63 are dispersed in the layer with a specific grain size distribution. That is, the fluorescent substance grains having large grain size are disposed at the portion of the fluorescent layer 63 adjacent to a transparent protective layer 64, the fluorescent substance grains having the fine grains size are distributed at the portion adjacent to an adhesive layer 62 of the support 61 and the grain size of the fluorescent substance dispersed throughout the fluorescent layer becomes gradually smaller from the surface transparent protective layer side 64 (the side utilizing the emission of the fluorescent substance) of the fluorescent layer to the back side (the support side 61) thereof.

The intensifying screen of this invention having the aforesaid fluorescent layer can be prepared in the following manner. That is, a transparent resinous protective layer is first formed on a smooth surface of a base plate and dried and then a dispersion of a fluorescent substance in a proper resinous binder is applied on the protective layer. The fluorescent layer thus applied is dried over a sufficient period of time at room temperature while controlling the replacement of the ambient air to cause fluorescent substance grains having different grain size to settle at different sedimentation velocities. In this case the drying period of the fluorescent layer for obtaining the desired grain size distribution of the fluorescent subject grains depends upon the kinds of the fluorescent substance and the resinous binder, the composition of the dispersion, the thickness of the fluorescent layer applied, etc., but is usually 5 to 25 hours, preferably 10 to 24 hours at about 10°–35° C, preferably 15°–25° C.

Before drying of the liquid fluorescent layer, the sedimentation of the fluorescent substance grains in the layer occurs according to the Stokes' law as follows:

$$V = ]D^2(\rho - \rho_0)g/18\eta] = (H/t)$$

wherein $\rho$ is density of the powdery particles, $\eta_0$ is the density of the liquid, $\eta$ is the viscosity of the liquid, $S$ is grain size, $V$ is sedimentation velocity, $H$ is distance, $t$ is time required for sedimentation, and $g$ is gravity. That is, in a stationary liquid layer, larger grains precipitate faster or to a lower portion (i.e., to the portion nearer to the transparent protective layer side on the base plate in the above-mentioned case), while finer grains settle later or remain in the upper portion.

After drying, the fluorescent layer is separated from the base plate together with the transparent protective layer and is applied under pressure to the adhesive-bearing surface of a cardboard or plastic support by heating to provide the intensifying screen of this invention.

The intensifying screen of this invention may also be prepared by an other method. In this second method, fluorescent substance grains are beforehand separated into large grains and fine grains by a proper manner such as by hydraulic elutriation, etc. The large grains of the fluorescent substance are first applied to the aforesaid protective layer formed on a smooth base plate as a dispersion in a proper resinous binder and after drying the layer over a sufficient period of time at room temperature while controlling the replacement of ambient air, the fine grains of the fluorescent substance are also applied to the layer as a dispersion in the resinous binder in the same manner as described above and are then dried. In this manner a fluorescent layer having a desired grain size distribution can be more surely obtained. The layer assembly thus formed is then separated from the base plate together with the transparent protective layer and is applied to an adhesive-bearing support as described above.

Also, when the fluorescent substance forming the fluorescent layer is a mixed fluorescent substance composed of two or more kinds of fluorescent substances, the fluorescent substance grains are distributed in the fluorescent layer with the distribution in accordance with the difference in grain size and the difference in specific gravity.

Furthermore, the intensifying screen of this invention may be prepared in the following manner. In this third method, fluorescent substance grains are beforehand separated into 3 to 4 or more grades of mean grain size by a proper means such as hydraulic elutriation, etc., and after dispersing each group of the fluorescent substance grains in a proper resinous binder, the dispersions thus prepared are applied, in succession, to a cardboard or a plastic support in such an order that the fluorescent layer containing the finer grains is disposed nearer the support and then heated before coating the subsequent dispersion. Further, if the fine grains of white pigment having a mean grain size of 1-2$\mu$ which is much smaller than that of the fluorescent substance grains, such as the fine grains of titanium dioxide, barium sulfate etc. are mixed with the fluorescent substance grains, a white layer of the fine grains can be formed at the bottom of the fluorescent layer in accordance with the grain size distribution as hereinbefore described. The white layer which is formed in accordance with this process does not exhibit a clear boundary face between the white layer and the fluorescent layer, which results in enhancement in the sharpness of the image obtained thereby.

Practical examples of the support used in this invention are cardboard, polyvinyl chloride, polyethylene, polystyrene and polyethylene terephthalate.

Also, in the intensifying screen of this invention any fluorescent substance ordinarily used for the purpose may be used and specific examples of the fluorescent substances are self-activated calcium tungstate, lead-activated barium sulfate, silver-activated zinc sulfide, terbium-activated gadolinium oxysulfide, terbium-activated lanthanum oxysulfide and terbium-activated yitrium oxysulfide. These substances may be used individually or as mixtures.

The fluorescent substances used in this invention generally have mean grain sizes of 1.5–15 microns.

Furthermore, examples of the resinous binder used for dispersing the fluorescent substance for forming the fluorescent layer are nitrocellulose, polymethyl methacrylate, vinyl chloride vinyl acetate copolymer and polyvinyl butyral.

Now, in the intensifying screen of this invention, the layer of the fine grains of the fluorescent substance or the layer of the fine grains of a white pigment mixed with the fluorescent substance disposed at the back surface (the support side) of the fluorescent layer serves for reflecting the emitted light from the portions near the surface portion (the side utilizing the emitted light from the fluorescent substance). Since the relection of the emitted light occurs at the aforesaid fine grain layer near the light-emitting portion, the scattering of light is less than in the case of forming a reflective layer at the surface of the support and thus by the grain distribution of this invention, the lack of definition in radiographs can be reduced and thus the response function of the intensifying screen in the low spatial frequency regions can be increased.

Figure 1:
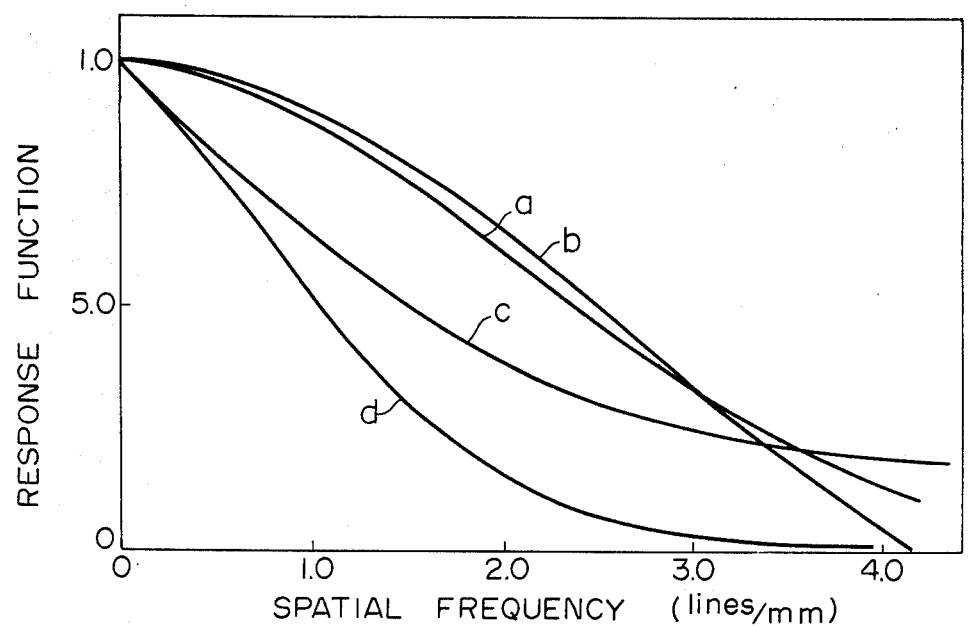
FIG. 1 is a graph showing the analyzed results of the unsharpness in radiographing systems.
Figure 2:
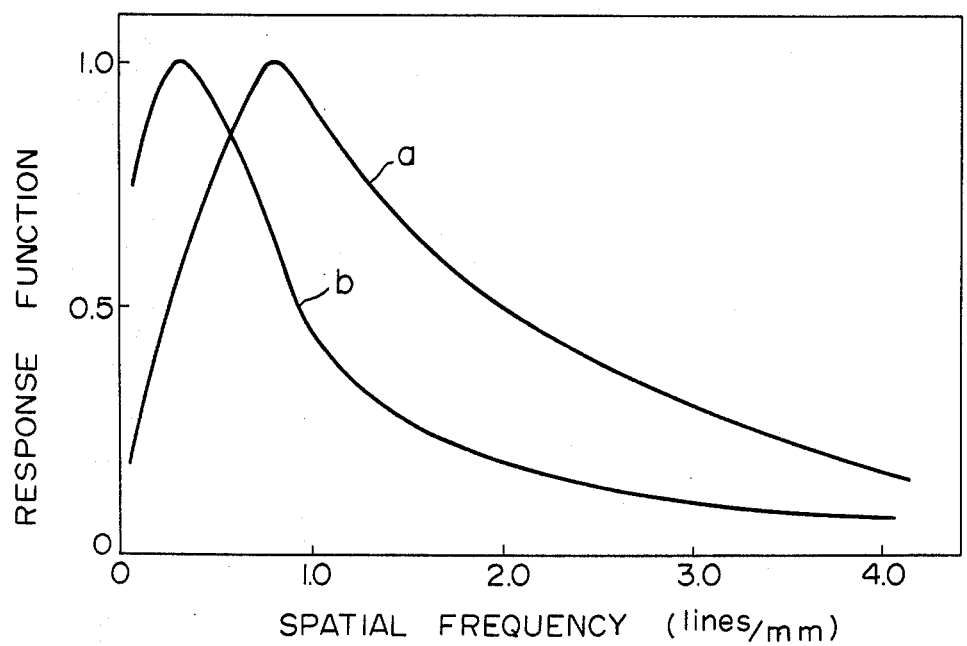
FIG. 2 is a graph showing the response function of the naked eye.
Figure 3:
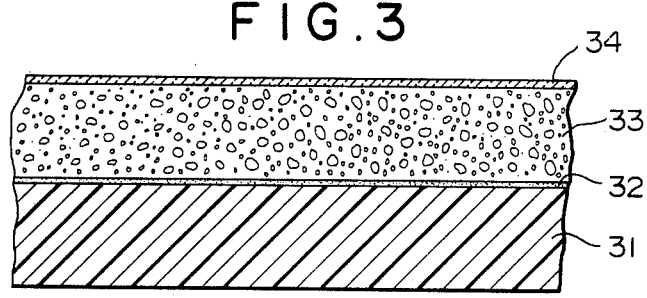
FIG. 3 is a schematic cross sectional view of a conventional intensifying screen.
Figure 5:
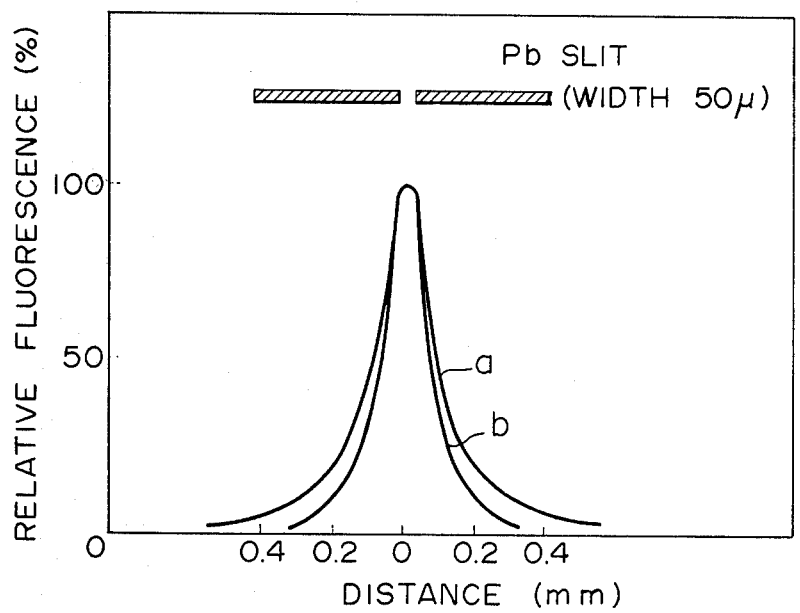
FIG. 5 is a graph showing the line image intensifying distribution of a conventional intensifying screen and that of an embodiment of the intensifying screen of this invention.
Figure 7:
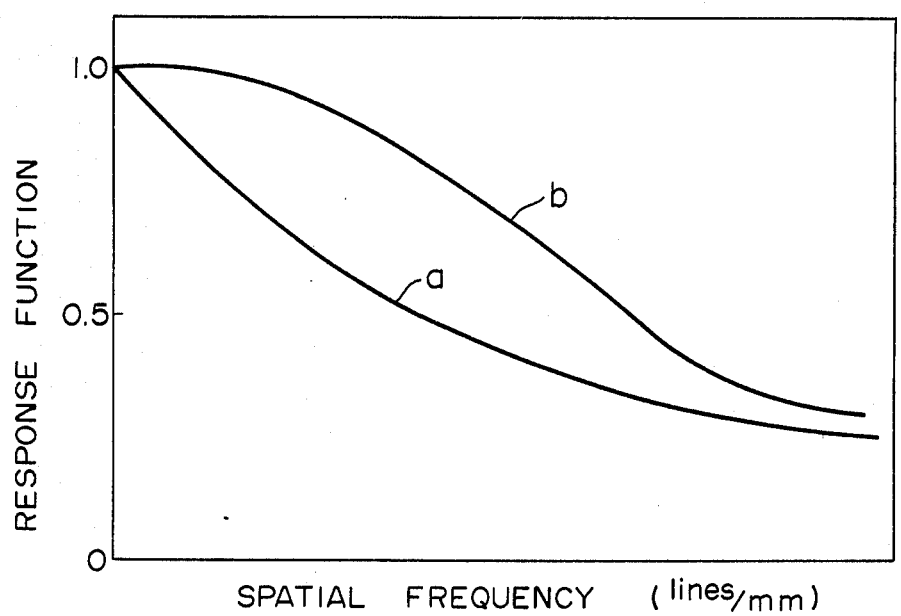
FIG. 7 is a graph showing the response function obtained by the Fourier transformation of the line image intensity distributions shown in FIG. 4.

Moreover, the line image intensity distribution of the intensifying screen of this invention is sharp as compared with that of conventional intensifying screens as illustrated by curve b and curve a respectively in FIG. 5. The response functions which are obtained by the Fourier transformation of curves a and b in FIG. 5 are ideally shown in FIG. 7. Curve a of FIG. 7 is the response function corresponding to curve a of FIG. 5, that is, the response function of a conventional intensifying screen, while curve b of FIG. 7 is the response function corresponding to curve b of FIG. 5, that is, the response function of the intensifying screen of this invention. As is clear from the comparison of curve a and curve b of FIG. 7, the intensifying screen of this invention shows an improvement in the spatial frequency characteristics in the low spatial frequency regions.

The invention will be explained more concretely by referring to the following examples but it will be understood that the invention is not limited to the disclosures in these examples.

EXAMPLE 1

A self-activated calcium tungstate fluorescent substance ($CaWO_4$) having a mean grain size of 5 microns and a standard deviation ($\log\sigma$) of 0.6 was classified into four groups of smaller than 2 microns, of 2-4 microns, of 4-7 microns, and of larger than 7 microns by hydraulic elutriation, each of the groups of the fluorescent substance grains thus separated was dispersed in a solution of nitrocellulose as a resinous binder in a mixed solvent of 1 part of ethyl acetate, 8 parts of butyl acetate, and 1 part of acetone at a residual resin to fluorescent substance ratio of 1:8, and then the viscosity of each dispersion was adjusted to 50 centistokes using the aforesaid mixed solvent. The dispersions of the fluorescent substance thus prepared were applied to a resin-coated wood free paper having a thickness of 0.4 mm successively in the order of from smaller grain dispersion to larger grain dispersion at thicknesses of 4 mg/cm$^2$, 14 mg/cm$^2$, 14 mg/cm$^2$, and 8 mg/cm$^2$ respectively by means of a knife coater while repeating coating and drying in each coating operation to provide a fluorescent layer. Thereafter, a solution of cellulose acetate in a mixed solvent of 7 parts of acetone, 2 parts of ethanol, and 1 part of amyl alcohol was uniformly applied to the fluorescent layer at a thickness of 10 microns to form a protective layer.

Figure 8:
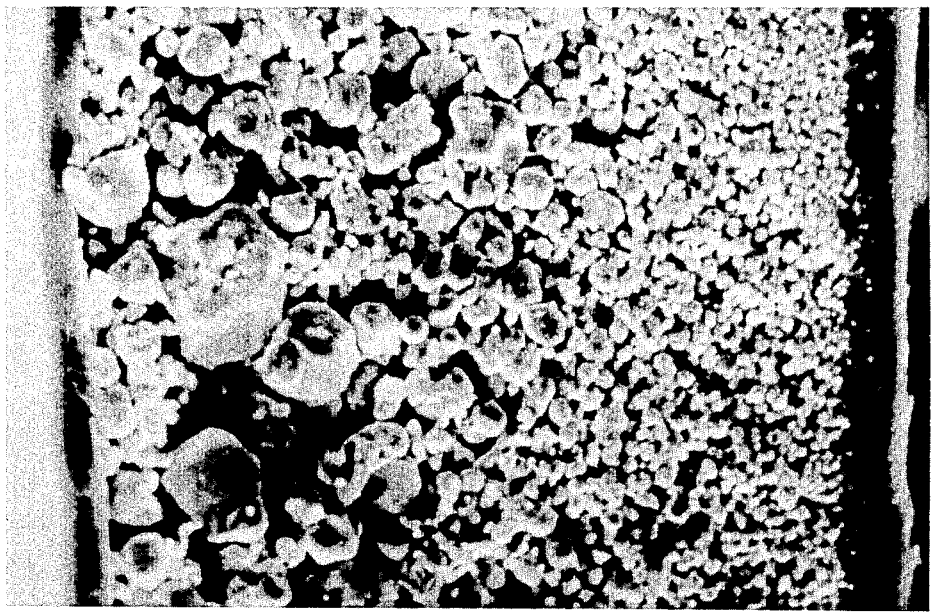
FIG. 8 is a scanning type electron photomicrograph of the cross section of the fluorescent layer of the intensifying screen of this invention.
Figure 4:
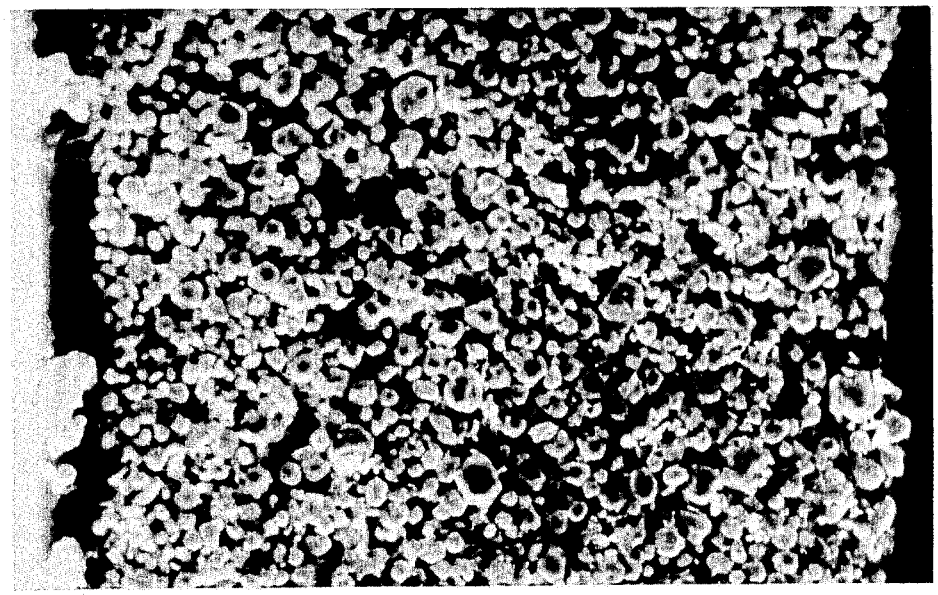
FIG. 4 is a scanning type electron microphotograph of the cross section of the fluorescent layer of a conventional intensifying screen.

The scanning electron microphotograph of the cross section of the fluorescent layer of the intensifying screen thus prepared is shown in FIG. 8. As is clear from FIG. 8 the fluorescent layer of the intensifying screen prepared in this example has such a grain size distribution of the fluorescent substance such that the grain size becomes smaller gradually from the surface of the fluorescent layer to the back surface thereof.

Figure 9:
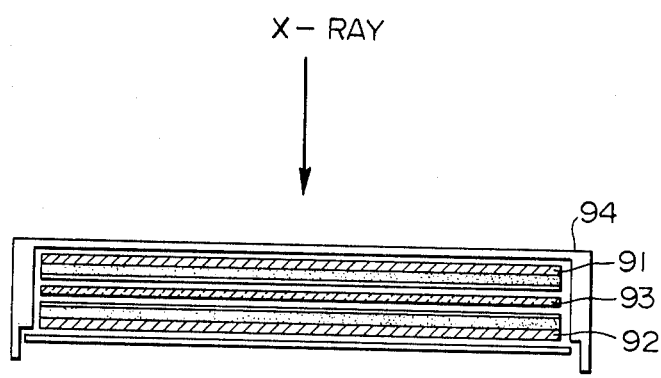
FIG. 9 is a schematic cross sectional view showing a configuration of a radiographing system employed for measuring the sharpness of intensifying screens.
Figure 10:
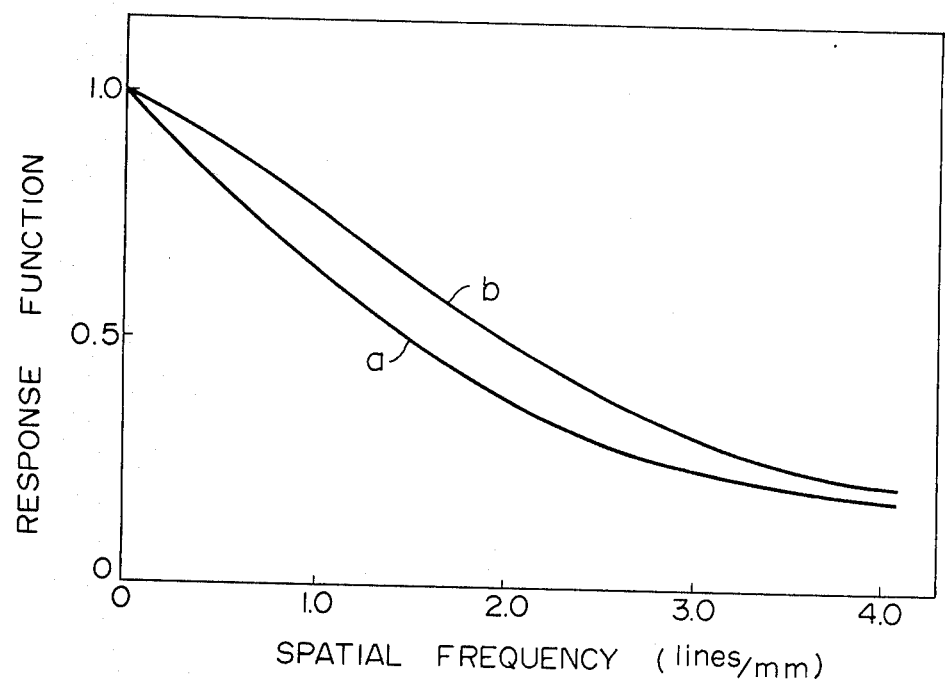
FIG. 10 is a graph showing the response functions of a conventional intensifying screen and of an embodiment of the intensifying screen of this invention.

Also, the response function of the intensifying screen thus prepared was measured in the system as illustrated in FIG. 9. That is, an X-ray film was inserted between a front intensifying screen 91 (the incident side of the X-ray beam) and a back intensifying screen 92, both of which intensifying screens were prepared by the aforesaid process, and the screen-film-screen sandwich was loaded in a cassette 94. Then, after exposing the assembly to X-ray beams, the response function of the screens was measured. The result is shown in FIG. 10 as curve b. Curve a of FIG. 10 stands for the spatial frequency characteristics of a conventional intensifying screen having the same sensitivity as that of the intensifying screen of this invention prepared by the above procedure. As is clear from the results shown in FIG. 10 the intensifying screen of this invention showed improved sharpness in, in particular, the low spatial frequency regions.

EXAMPLE 2

The same procedure as in Example 1 was followed while using a lead-activated barium sulfate fluorescent substance ($BaSO_4$:Pb, Pb-activation amount 5 wt%, specific gravity 4.8) having a mean grain size of 1.5 microns and a deviation ($\log\sigma$) of 0.2 in place of the calcium tungstate fluorescent substance of the group having a grain size of smaller than 2 microns in Example 1. The fluorescent layer of the intensifying screen thus prepared had a grain size distribution of the fluorescent substances such that the grain sizes became smaller gradually from the surface of the fluorescent layer to the back surface thereof as shown in FIG. 8. The spatial frequency characteristics of the intensifying screen thus prepared were almost the same as those shown by curve b of FIG. 8.

EXAMPLE 3

The same procedure as in Example 1 was followed while using titanium oxide having a mean grain size of 1.5 microns and a deviation ($\log\sigma$) of 0.21 in place of the calcium tungstate fluorescent substance of the group having a grain size of smaller than 2 microns. The fluorescent layer of the intensifying screen thus prepared had a grain size distribution of the fluorescent substances such that the grain sizes became smaller gradually from the surface of the fluorescent layer to the back surface of the fluorescent layer as shown in FIG. 8 also. The spatial frequency characteristics of the screen were also the same as those shown by curve b in FIG. 10.

EXAMPLE 4

A cellulose acetate solution was uniformly applied to a smooth base plate at a thickness of 10 microns and dried to form a protective layer. A self-activated calcium tungstate fluorescent substance ($CaWO_4$) having a mean grain size of 5 microns and a deviation ($\log\sigma$) of 0.6 was dispersed in a solution of nitrocellulose as a resinous binder at a residual resin to fluorescent substance ratio of 1:8 and after adjusting the viscosity of the dispersion to 30 centistokes, the dispersion was applied to the protective layer prepared as mentioned above by means of a knife coater at a thickness of 40 mg/cm$^2$. The fluorescent layer thus applied was dried for 10 hours at 15° C while controlling the replacement of the ambient air. After drying, the fluorescent layer was separated from the base plate together with the protective layer and was applied under pressure onto a resin-coated wood free paper having a thickness of 0.4 mm by heating.

The fluorescent layer of the intensifying screen thus prepared had a grain size distribution of the fluorescent substance such that the grain size became smaller gradually from the surface of the fluorescent layer to the back surface thereof. The spatial frequency characteristics of the intensifying screen thus prepared were also the same as those shown by curve *b* of FIG. 10.

EXAMPLE 5

A cellulose acetate solution was uniformly applied to a smooth base plate at a thickness of 10 microns and dried. A 9:1 mixture of a self-activated calcium tungstate fluorescent substance having a mean grain size of 5 microns and a deviation (log$\sigma$) of 0.6 and a lead-activated barium sulfate fluorescent substance having a mean grain size of 1.5 microns and a deviation (log$\sigma$) of 0.2 were dispersed in a nitrocellulose resinous binder at a residual resin to fluorescent mixture ratio of 1:8 and after adjusting the viscosity of the dispersion to 30 centistokes and thoroughly mixing the mixture in a ball mill, the mixture was applied to the protective layer prepared above by means of a knife coater at a thickness of 40 mg/cm$^2$. Thereafter, the fluorescent layer thus formed was treated as in Example 4. The fluorescent layer of the intensifying screen thus prepared had a grain size distribution of the fluorescent substances such that the grain size became smaller gradually from the surface of the fluorescent layer to the back surface thereof. The spatial frequency characteristics of the intensifying screen were also the same as those shown by curve *b* of FIG. 10.

EXAMPLE 6

An intensifying screen was obtained by following the same procedure as in Example 5 while using titanium oxide having a mean grain size of 1.5 microns and a deviation (log$\sigma$) of 0.21 in place of the lead-activated barium sulfate fluorescent substance in the same example. The fluorescent layer of the intensifying screen thus prepared had a grain size distribution of the fluorescent substances such that the grain size became smaller gradually from the surface of the fluorescent layer to the back surface thereof. The spatial frequency characteristics of the intensifying screen were also the same as those shown by curve *b* of FIG. 10.

In all examples described above, knife coating was employed in applying the dispersions but as a matter of course the same results can be obtained by employing other coating methods. Also, resinous binders other than the nitrocellulose used in the above examples can also be employed to obtain similar merits to the above. Furthermore, other fluorescent substances and white pigments than those illustrated in the above examples can be used in this invention.

We claim:

1. A radiographic intensifying screen comprising a support having applied thereon a fluorescent layer containing fluorescent substance grains dispersed therein and having a grain size distribution of said fluorescent substance grains such that the grain size becomes smaller gradually from one surface of the fluorescent layer on the side utilizing the emitted light from the fluorescent substance to the other surface thereof on the support side.

2. The radiographic intensifying screen as claimed in claim 1 wherein a transparent protective layer is further formed on said fluorescent layer.

3. The radiographic intensifying screen as claimed in claim 1 wherein said fluorescent substance is selected from the group consisting of self-activated calcium tungstate, lead-activated barium sulfate, silver-activated zinc sulfide, lead-activated gadolinium oxysulfide, terbium-activated lanthanum oxysulfide and terbium-activated yitrium oxysulfide.

4. The radiographic intensifying screen as claimed in claim 1 wherein said fluorescent substance has mean grain sizes of from 1.5 microns to 15 microns.

5. The radiographic intensifying screen as claimed in claim 1 wherein said fluorescent substance is dispersed in a resinous binder of the fluorescent layer, and the resinous binder is selected from the group consisting of nitrocellulose, polymethyl methacrylate, vinyl chloride vinyl acetate copolymer and polyvinyl butyral.

6. The radiographic intensifying screen as claimed in claim 1 wherein said fluorescent layer further contains fine grains of a white pigment the mean grain size of which is much smaller than that of said fluorescent substance grains.

7. A radiographic intensifying screen prepared by applying a protective layer to a smooth base plate, applying a dispersion of fluorescent substance grains in a resinous binder to the protective layer where the grain size distribution of said fluorescent substance grains ranges from a large grain group to a fine grain group, allowing the dispersion layer to dry at room temperature for a sufficient period of time for providing the grain size distribution of the fluorescent substance grains through the dispersion layer by sedimentation, separating the fluorescent layer thus dried from the base together with the protective layer, and applying the layer to a support with the fine grain group disposed near said support.

8. A radiographic intensifying screen prepared by separating fluorescent substance grains into a large grain group and a fine grain group, applying first the dispersion of the large grain group of the fluorescent substance in a resinous binder to a protective layer formed on a smooth base plate, allowing the dispersion layer to dry at room temperature for a sufficient period of time, thereafter applying the dispersion of the fine grain group thereof in a resinous binder to the large grain layer, allowing the dispersion to dry at room temperature for a sufficient period of time, separating the layers from the base plate together with the protective layer, and applying the layers to a support with the fine grain layer disposed near the support.

9. A radiographic intensifying screen prepared by separating the fluorescent grains into three or more groups having different mean grain sizes, dispersing each of the grain groups in a resinous binder, applying each of the dispersions to a support in such an order that the dispersion of the finer grain group is disposed near to said support and drying each dispersion applied prior to the application of the following dispersion.

10. A method of making a radiographic intensifying screen comprising the steps of applying a protective layer to a smooth base plate, applying a dispersion of fluorescent substance grains in a resinous binder to the protective layer where the grain size distribution of said fluorescent substance grains ranges from a large grain group to a fine grain group, allowing the dispersion layer to dry at room temperature for a sufficient period of time for providing the grain size distribution of the fluorescent substance grains through the dispersion layer by sedimentation, separating the fluorescent layer thus dried from the base plate together with the protective layer, and applying the layer to a support with the fine grain group disposed near said support.

11. A method of making a radiographic intensifying screen comprising the steps of separating fluorescent substance grains into a large grain group and a fine grain group, applying first the dispersion of the large grain group of the fluorescent substance in a resinous binder to a protective layer formed on a smooth base plate, allowing the dispersion layer to dry at room temperature for a sufficient period of time, thereafter applying the dispersion of the fine grain group thereof in a resinous binder of the large grain layer, allowing the dispersion to dry at room temperature for a sufficient period of time, separating the layers from the base plate together with the protective layer, and applying the layers to a support with the fine grain layer disposed near the support.

12. A method of making a radiographic intensifying screen comprising the steps of separating the fluorescent substance grains into three or more groups having different mean grain sizes, dispersing each of the grain groups in a resinous binder, applying each of the dispersions to a support in such an order that the dispersion of the finer grain group is disposed near to said support and drying each dispersion applied prior to the application of the following dispersion.

* * * * *

UNITED STATES PATENT AND TRADEMARK OFFICE
CERTIFICATE OF CORRECTION

PATENT NO. : 4,039,840
DATED : August 2, 1977
INVENTOR(S) : KEIJI SHIMIYA, ET AL.

It is certified that error appears in the above-identified patent and that said Letters Patent are hereby corrected as shown below:

Col. 9, line 68, Claim 3, delete "lead" and substitute therefor --terbium--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks